US009411218B2

(12) United States Patent
Hsieh et al.

(10) Patent No.: US 9,411,218 B2
(45) Date of Patent: Aug. 9, 2016

(54) WAVELENGTH CONVERSION DEVICE AND PROJECTOR

(71) Applicants: Chi-Tang Hsieh, Hsin-Chu (TW); Ko-Shun Chen, Hsin-Chu (TW); Chi-Hsun Wang, Hsin-Chu (TW); Kun-Liang Jao, Hsin-Chu (TW)

(72) Inventors: Chi-Tang Hsieh, Hsin-Chu (TW); Ko-Shun Chen, Hsin-Chu (TW); Chi-Hsun Wang, Hsin-Chu (TW); Kun-Liang Jao, Hsin-Chu (TW)

(73) Assignee: Coretronic Corporation, Hsin-Chu (TW)

( * ) Notice: Subject to any disclaimer, the term of this patent is extended or adjusted under 35 U.S.C. 154(b) by 97 days.

(21) Appl. No.: 14/464,715

(22) Filed: Aug. 21, 2014

(65) Prior Publication Data
US 2015/0185596 A1  Jul. 2, 2015

(30) Foreign Application Priority Data
Dec. 27, 2013  (TW) .............................. 102148785 A

(51) Int. Cl.
*G03B 21/20* (2006.01)
*G03B 21/14* (2006.01)
*G02B 26/00* (2006.01)
*H04N 9/31* (2006.01)
*G03B 33/08* (2006.01)
*G02B 1/11* (2015.01)

(52) U.S. Cl.
CPC ............ *G03B 21/204* (2013.01); *G02B 26/008* (2013.01); *G03B 21/142* (2013.01); *G03B 33/08* (2013.01); *H04N 9/3114* (2013.01); *H04N 9/3158* (2013.01); *G02B 1/11* (2013.01)

(58) Field of Classification Search
CPC ............ G03B 21/204; G03B 21/2013; G03B 21/2033; G03B 21/208; G03B 21/2066; F21V 9/10; F21V 9/16
See application file for complete search history.

(56) References Cited

U.S. PATENT DOCUMENTS

| | | | |
|---|---|---|---|
| 8,157,398 B2 | 4/2012 | Yamamoto | |
| 2006/0238909 A1 | 10/2006 | Auell | |
| 2009/0284148 A1* | 11/2009 | Iwanaga | G02B 26/008 313/506 |
| 2010/0328632 A1* | 12/2010 | Kurosaki | G03B 21/204 353/98 |
| 2011/0116253 A1* | 5/2011 | Sugiyama | F21S 10/007 362/84 |
| 2012/0147601 A1* | 6/2012 | Li et al. | G03B 21/204 362/231 |
| 2012/0243205 A1* | 9/2012 | Lin | G03B 21/204 362/84 |
| 2014/0111967 A1* | 4/2014 | Rehn | F21V 9/10 362/84 |

FOREIGN PATENT DOCUMENTS

| | | |
|---|---|---|
| CN | 2497341 | 6/2002 |
| CN | 1512260 | 7/2004 |

(Continued)

OTHER PUBLICATIONS

"Office Action of China Counterpart Application," issued on Jan. 25, 2016, p. 1-p. 7.

*Primary Examiner* — Sultan Chowdhury
(74) *Attorney, Agent, or Firm* — Jianq Chyun IP Office

(57) ABSTRACT

A wavelength conversion device including a main body and a transparent component is provided. The main body has at least one wavelength conversion region and a slot. The transparent component is disposed in the slot to form a light transmission region, wherein one of the main body and the transparent component has at least one groove, and another one of the main body and the transparent component is engaged with the groove, such that the main body and the transparent component are fixed together. In addition, a projector having the wavelength conversion device is also provided.

20 Claims, 5 Drawing Sheets

(56) References Cited

FOREIGN PATENT DOCUMENTS

| CN | 101339352 | 1/2009 |
| CN | 102650815 | 8/2012 |
| CN | 203311071 | 11/2013 |
| TW | 200600840 | 1/2006 |
| TW | 200837483 | 9/2008 |

* cited by examiner

WAVELENGTH CONVERSION DEVICE AND PROJECTOR

CROSS-REFERENCE TO RELATED APPLICATION

This application claims the priority benefit of Taiwan application serial no. 102148785, filed on Dec. 27, 2013. The entirety of the above-mentioned patent application is hereby incorporated by reference herein and made a part of this specification.

BACKGROUND

1. Field of the Invention

The invention relates to an optical device and a display apparatus having this optical device, and more particularly to a wavelength conversion device and a projector having this wavelength conversion device.

2. Description of Related Art

Recently, projection apparatuses which adopted solid state light sources such as light-emitting diode (LED) and laser diode have gradually became the mainstream in the market. Since a laser diode has a light emitting efficiency higher than about 20%, pure light sources of a projector which are generated by exciting phosphor powder with laser diodes are gradually being developed, in order to break through the limits of LED light sources. In addition, a laser projection apparatus can excite phosphor powder with laser, and it can also directly use the laser as a light source of the projector, and the laser projection apparatus has advantage of adjusting the number of light sources according to demand of brightness, in order to achieve the demand of the projector with different brightness. Therefore, using a laser as a light source of projector architecture has a tremendous potential to replace methods of using conventional ultra high pressure (UHP) lamps and become a new mainstream of light sources of projectors.

In existing laser projectors, a phosphor wheel is formed by filling phosphor powder on a metal substrate with high reflectance, and light with different colors (e.g. green light and yellow light) is generated by exciting the phosphor powder on the metal substrate with a laser emitted by a laser light source, and the laser (e.g. blue light) can directly go through the phosphor wheel by going through a slot on the metal substrate, in order to generate light with multiple colors. In the aforementioned design, the slot will make wind-cut noise during the rotation of the metal substrate. In addition, during the rotation, in order to prevent the wobble due to the asymmetric structure created by the slot of the metal substrate, another slot is being added on metal substrates of some phosphor wheels to acquire the symmetric structure of the metal substrate. However, adding another slot is making the problem of wind-cut noise become even worse, and reducing heat dissipation area of the metal substrate resulting in the reduction of heat dissipation efficiency of the phosphor wheels.

According to the invention disclose by the U.S. Pat. No. 8,157,398, a light emission wheel is applied to a projector, and the light emission wheel includes an opaque substrate and a transparent diffusion substrate attached to the opaque substrate. A blue excitation light emitted by a light emitter can excite phosphor powder on the opaque substrate or directly pass through the transparent diffusion substrate. According to the invention disclosed by the Taiwan patent application no. 200837483, a color wheel component is applied to a projector. The color wheel component includes a gasket and a color filter, and the color filter is embedded in the slot of the gasket.

SUMMARY OF THE INVENTION

In summary, the embodiment or embodiments of the invention may have at least one of the following advantages. The invention provides a wavelength conversion device which may prevent wind-cut noise during operation and have good heat dissipation efficiency.

The invention provides a wavelength conversion device and a projector having the wavelength conversion device which can reduce production costs and prevent the problem of wind-cut noise.

Other objects and advantages of the invention can be further illustrated by the technical features broadly embodied and described as follows.

In order to achieve one or a portion of or all of the objects or other objects, one embodiment of the invention provides a wavelength conversion device including a main body and a transparent component. The main body has at least one wavelength conversion region and a slot. The transparent component is disposed in the slot to form a light transmission region, wherein one of the main body and the transparent component has at least one groove, and another one of the main body and the transparent component is engaged with the groove, such that the main body and the transparent component are fixed together.

In one embodiment of the invention, the groove is formed on a side of the transparent component, and an inner edge of the slot of the main body is engaged in the groove.

In one embodiment of the invention, the groove is formed on an inner edge of the slot of the main body, and a side of the transparent component is engaged in the groove.

In one embodiment of the invention, the wavelength conversion device further includes an adhesive, wherein the main body and the transparent component are bounded together by the adhesive.

In one embodiment of the invention, the adhesive is at least partially located in the groove.

In one embodiment of the invention, the number of the at least one groove is two, and two opposite sides of the transparent component is fixed to the main body through the two grooves.

In one embodiment of the invention, the material of the transparent component includes glass, and the main body is a metal substrate.

In one embodiment of the invention, the transparent component has an anti-reflection layer thereon, such that the transmittance of the transparent component is greater than 98%.

In one embodiment of the invention, the wavelength conversion device further includes a first component and a second component, wherein the first component and the second component are respectively disposed on two opposite surfaces of the main body, and the transparent component is at least partially sandwiched between the first component and the second component.

In one embodiment of the invention, the transparent component fully covers the slot, such that the main body and the transparent component form a disk structure, and the groove extends in a radial direction of the disk structure.

In order to achieve one or a portion of or all of the objects or other objects, one embodiment of the invention provides a projector including a light source, a light valve, a lens and a wavelength conversion device. The light source is suitable for providing an illumination beam. The light valve is disposed on a path of the illumination beam to convert the illumination beam into an image beam. The lens is disposed on a path of the image beam to convert the image beam into a projection beam. The wavelength conversion device is disposed on the path of the illumination beam and includes a main body and a transparent component. The main body has at least one wavelength conversion region and a slot. The transparent component is disposed in the slot to form a light transmission region, wherein the main body is suitable to move, such that the wavelength conversion region and the light transmission region respectively move to the path of the illumination beam, and one of the main body and the transparent component has at least one groove, and another one of the main body and the transparent component is engaged with the groove, such that the main body and the transparent component are fixed together.

In view of the above, the embodiment of the invention at least has one of the following advantages. In the wavelength conversion device of the abovementioned embodiments of the invention, the transparent component is disposed in the slot of the main body, such that the slot is fully covered by the transparent component to prevent wind-cut noise during operation of the main body. Since the transparent component is disposed in the slot and the main body and the transparent component form a disk structure, the problem of the asymmetric structure of wavelength conversion device caused by disposing a slot can be solved. Therefore, there's no need to add another slot on the main body for solving the problem of the asymmetric structure, such that the production costs of the wavelength conversion device can be reduced, and the problem of the wind-cut noise can be prevented from becoming even worse by adding too many slots. In addition, since the main body of the wavelength conversion device doesn't need to add another slot as mentioned above, the wavelength conversion device has a bigger heat dissipation area and better heat dissipation efficiency. Moreover, one of the main body and the transparent component of the wavelength conversion device has a groove, and another one of the main body and the transparent component is fixed to the groove by matching up with the groove, such that the total structure of the wavelength conversion device can be more firmly fixed.

Other objectives, features and advantages of the invention will be further understood from the further technological features disclosed by the embodiments of the invention wherein there are shown and described preferred embodiments of this invention, simply by way of illustration of modes best suited to carry out the invention.

BRIEF DESCRIPTION OF THE DRAWINGS

The accompanying drawings are included to provide a further understanding of the application, and are incorporated in and constitute a part of this specification. The drawings illustrate embodiments of the application and, together with the description, serve to explain the principles of the application.

DETAILED DESCRIPTION OF DISCLOSED EMBODIMENTS

In the following detailed description of the preferred embodiments, reference is made to the accompanying drawings which form a part hereof, and in which are shown by way of illustration specific embodiments in which the invention may be practiced. In this regard, directional terminology, such as "top," "bottom," "front," "back," etc., is used with reference to the orientation of the Figure(s) being described. The components of the present invention can be positioned in a number of different orientations. As such, the directional terminology is used for purposes of illustration and is in no way limiting. On the other hand, the drawings are only schematic and the sizes of components may be exaggerated for clarity. It is to be understood that other embodiments may be utilized and structural changes may be made without departing from the scope of the present invention. Also, it is to be understood that the phraseology and terminology used herein are for the purpose of description and should not be regarded as limiting. The use of "including," "comprising," or "having" and variations thereof herein is meant to encompass the items listed thereafter and equivalents thereof as well as additional items. Unless limited otherwise, the terms "connected," "coupled," and "mounted" and variations thereof herein are used broadly and encompass direct and indirect connections, couplings, and mountings. Similarly, the terms "facing," "faces" and variations thereof herein are used broadly and encompass direct and indirect facing, and "adjacent to" and variations thereof herein are used broadly and encompass directly and indirectly "adjacent to". Therefore, the description of "A" component facing "B" component herein may contain the situations that "A" component directly faces "B" component or one or more additional components are between "A" component and "B" component. Also, the description of "A" component "adjacent to" "B" component herein may contain the situations that "A" component is directly "adjacent to" "B" component or one or more additional components are between "A" component and "B" component. Accordingly, the drawings and descriptions will be regarded as illustrative in nature and not as restrictive.

Figure 1:
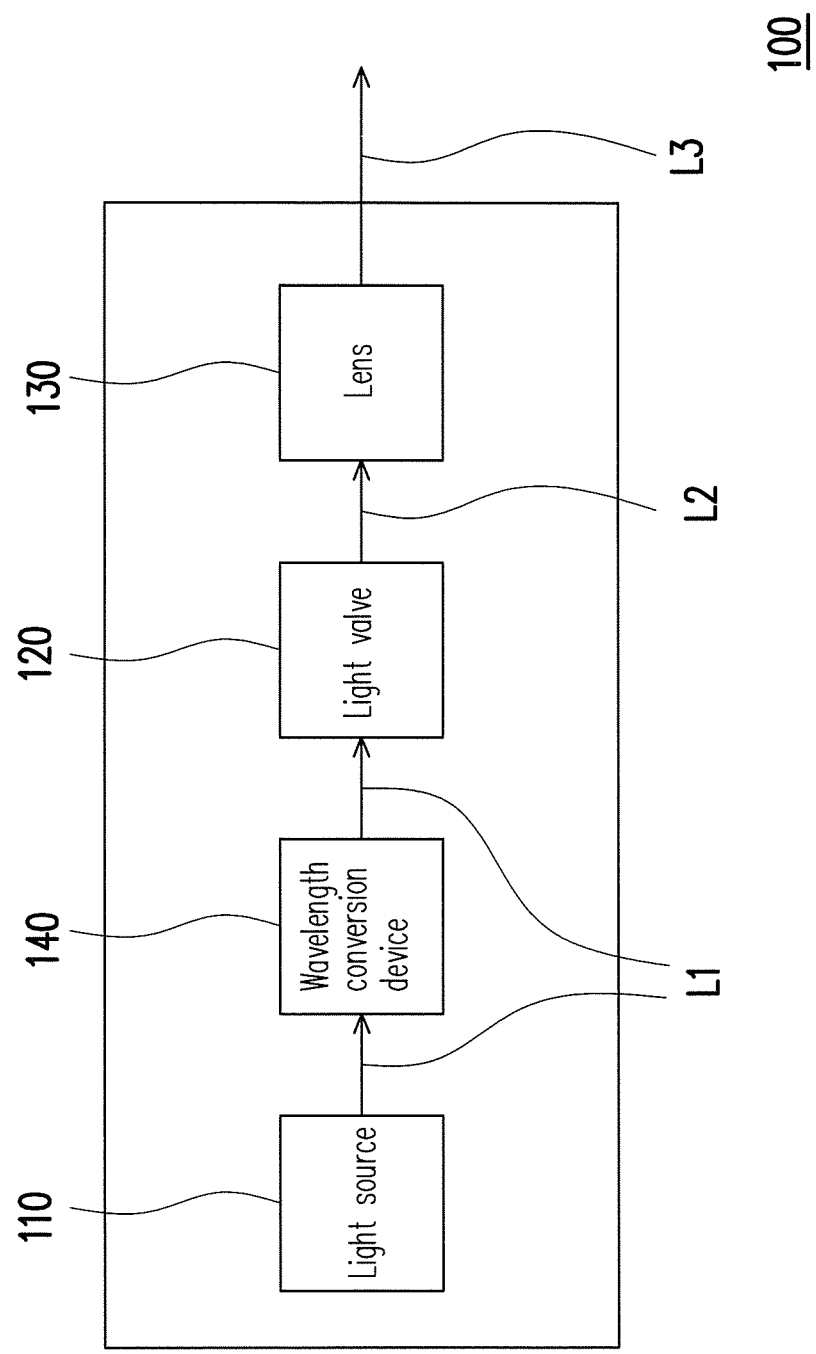
FIG. 1 is a schematic view of some structure components of a projector according to one embodiment of the invention.

FIG. 1 is a schematic view of some structure components of a projector according to one embodiment of the invention. Referring to FIG. 1, the projector 100 of the embodiment includes a light source 110, a light valve 120, a lens 130 and a wavelength conversion device 140. The light source 110 is suitable for providing an illumination beam L1, the light valve 120 is disposed on the path of the illumination beam L1 to convert the illumination beam L1 into an image beam L2. The lens 130 is disposed on the path of the image beam L2 to convert the image beam into a projection beam L3, and the wavelength conversion device 140 is disposed on the path of the illumination beam L1. For example, the light source 110 is a laser light source which is suitable for emitting blue laser light (i.e., the illumination beam L1), and the wavelength conversion device 140 is a phosphor wheel having phosphor powder with different colors thereon, and beams with different colors is respectively generated by exciting the phosphor powder with the laser (i.e. the illumination beam L1). A specific description is provided below.

Figure 3:
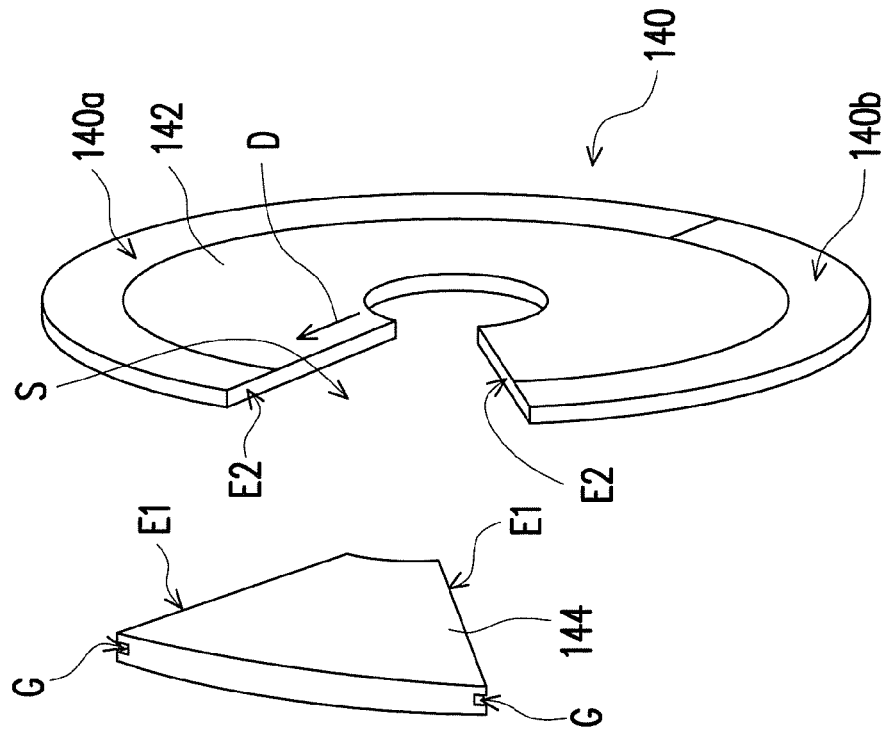
FIG. 3 is an exploded view of the wavelength conversion device of FIG. 2.
Figure 2:
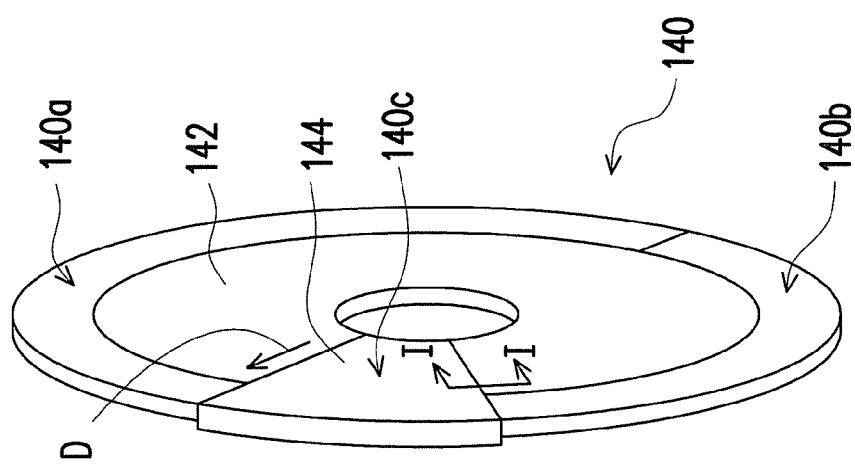
FIG. 2 is a perspective view of some structure components of the wavelength conversion device in FIG. 1.

FIG. 2 is a structural perspective view of some structure components of the wavelength conversion device in FIG. 1. FIG. 3 is an exploded view of the wavelength conversion device of FIG. 2. Referring to both FIG. 2 and FIG. 3, a wavelength conversion device 140 of the embodiment includes a main body 142 and a transparent component 144. The main body 142 is a metal substrate, for example, and at least a wavelength conversion region is disposed on the main body 142. In the embodiment, the main body 142 has two wavelength conversion regions, which are wavelength conversion region 140a and wavelength conversion region 140b respectively, and the main body 142 further includes a slot S, wherein the material of the main body 142, which is configured to reflect the light, is aluminum or other proper metal material with high capability of heat conduction, for example. The wavelength conversion region 140a and the wavelength conversion region 140b are filled with phosphor powder with different color, which are configured to convert the blue laser light into color light with different wavelength, and the transparent component 144 is disposed in the slot S of the main body 142 to form a light transmission region 140c. The material of the transparent component 144 is glass, for example, and the light transmittance of the glass may be about 95%, wherein the transparent component 144 may be coated with anti-reflection layer thereon to improve the light transmittance of the transparent component 144, such that the transmittance of the transparent component 144 is greater than 98%, for example.

Figure 4:
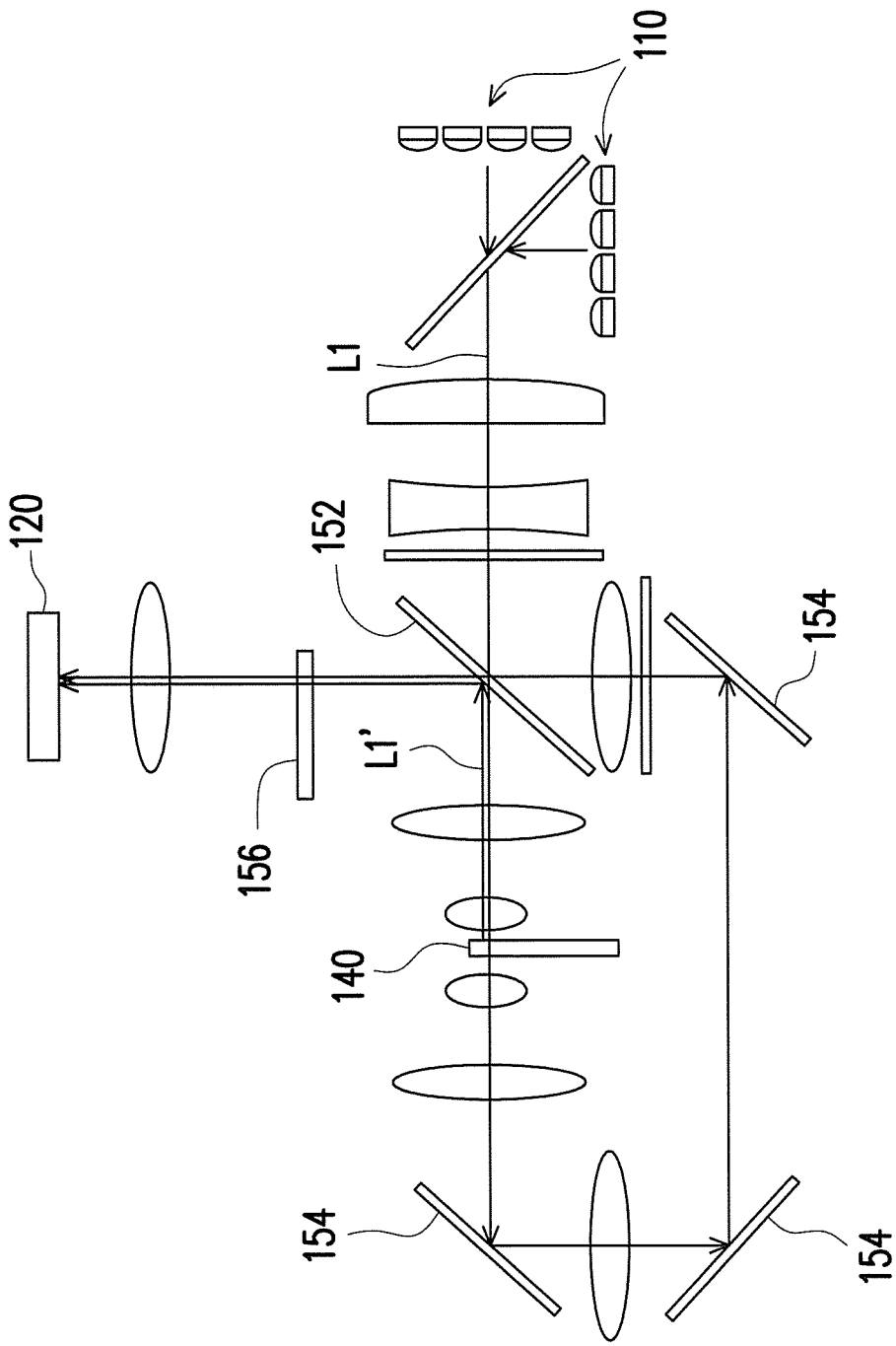
FIG. 4 is a schematic view of some structure components of the projector of FIG. 1.

FIG. 4 is a schematic view of some structure components of the projector of FIG. 1. Referring to both FIG. 2 and FIG. 4, the illumination beam L1 (blue laser light) provided by the light source 110 is suitable to pass through the dichroic mirror 152 and reach the wavelength conversion device 140, and the main body 142 of the wavelength conversion device 140 is suitable to rotate around a rotation axis (not illustrated), such that the wavelength conversion region 140a, the wavelength conversion region 140b and the light transmission region 140c are rotated into the path of the illumination beam L1 in order. When the wavelength conversion region 140a or the wavelength conversion region 140b is moved into the path of the illumination beam L1, the illumination beam L1 excites the phosphor powder on the wavelength conversion region 140a or the phosphor power on the wavelength conversion region 140b to produce illumination beams L1' with different color (green light or yellow light) correspondingly, and the excited illumination beams L1' are reflected to the dichroic mirror 152 by the main body 142 and moving toward the light valve 120 after being reflected by the dichroic mirror 152. On the other hand, when the light transmission region 140c of the wavelength conversion device 140 is rotated to the path of the illumination beam L1, the illumination beam directly passes through the transparent component 144, and, by the reflection of multiple reflection mirrors 154, the illumination beam L1 is led toward the dichroic mirror 152 and moving toward the light valve 120 after passing through the dichroic mirror 152. By doing so, illumination beams with multiple different color can be provided to the light valve 120. In the embodiment, a color filter wheel 156 is further disposed between the dichroic mirror 152 and the light valve 120, and the illumination beam L1 (blue laser light) passing through the transparent component 144 and the illumination beam L1' (green light or yellow light) are filtered by the color filter wheel 156, and red, green, yellow, blue color light is provided to the light valve 120.

In the embodiment, referring to both FIG. 2 and FIG. 3, the slot S of the main body 142 is a fan-shaped notch, for example, and the shape of the transparent component 144 is substantially the same as the fan shape of the slot S. Therefore, when the transparent component 144 is disposed on the slot S, the fan-shaped notch can be fully covered by the transparent component 144, such that the main body 142 and the transparent component 144 form a complete disk structure. In such configuration, the transparent component 144 is disposed in the slot S of the main body 142, such that the slot S is fully covered by the transparent component 144 to prevent wind-cut noise during rotation of the main body 142. Since the transparent component 144 is disposed in the slot S, the problem of the asymmetric structure of wavelength conversion device 140 caused by disposing a slot S can be solved. Therefore, there's no need to add another slot on the main body 142 for solving the problem of the asymmetric structure, such that the production costs of the wavelength conversion device 140 can be reduced, and the problem of the wind-cut noise can be prevented from becoming even worse by adding too many slots on the main body 142. In addition, since the main body 142 of the wavelength conversion device 140 doesn't need to add another slot as mentioned above, the wavelength conversion device 140 has a bigger heat dissipation area and better heat dissipation efficiency. Moreover, the phosphor powder filled on the wavelength conversion region 140a and the wavelength conversion region 140b of the main body 142 are mixed with silicone, for example, and, by using the above-mentioned method to improve the heat dissipation efficiency of the wavelength conversion device 140, the problem of the degeneration of the over-heated silicon causing the degradation of the conversion efficiency of the phosphor powder during excitation can be prevented.

Figure 5:
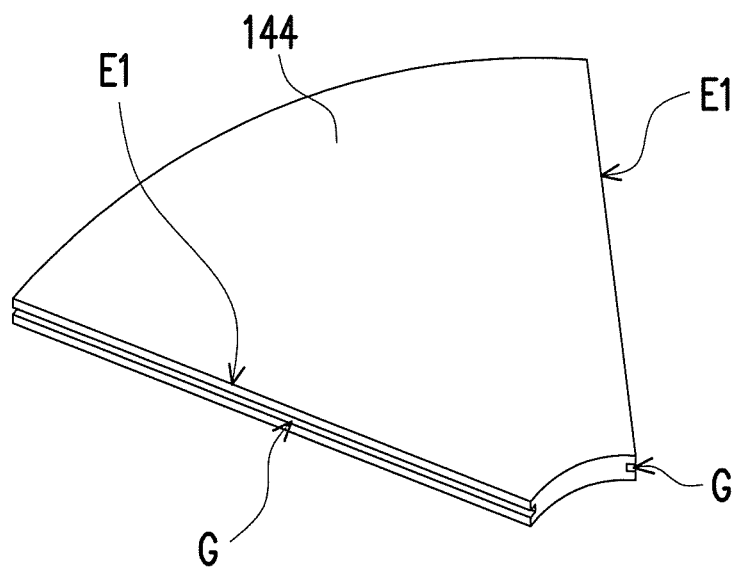
FIG. 5 is a perspective view of the transparent component of FIG. 3 from another view angle.

FIG. 5 is a perspective view of the transparent component of FIG. 3 from another view angle. Referring to both FIG. 3 and FIG. 5, in the embodiment, the transparent component 144 has two grooves G, and grooves G can be micro-notches, the two grooves G are respectively formed on the two opposite sides E1 of the transparent component 144, and two inner edges E2 of the slot S of the main body 142 are tightly engaged with the two grooves G of the transparent component 144 respectively, such that the two sides E1 of the transparent component 144 are fixed on the main body 142 by the two grooves G in order to more tightly fixed the total structure of the wavelength conversion device 140.

As shown in FIG. 2, the main body 142 and the transparent component 144 of the embodiment substantially form a complete disk structure, and each of the grooves G is extended along the radial direction D of the disk structure, and the lengths of the grooves in radial direction D are substantially the same as the length of the inner edge E2 of the slot S, such that the transparent component 144 can be tightly fixed to the main body 142 through the grooves G.

Figure 6:
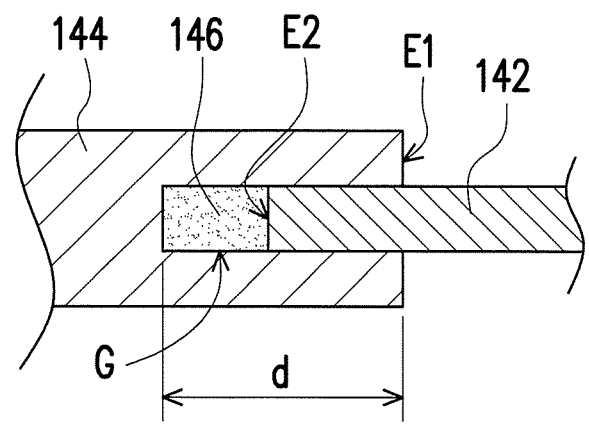
FIG. 6 is a partial cross-sectional view of the wavelength conversion device of FIG. 2 taken along a line I-I.

FIG. 6 is a partial cross-sectional view of the wavelength conversion device of FIG. 2 taken along a line I-I. Referring to both FIG. 2 and FIG. 6, the wavelength conversion device 140 of the embodiment further includes an adhesive 146, and the adhesive 146 is at least partially located in the grooves G, such that when the two inner edges E2 of the slot S are engaged in the grooves G of the transparent component 144, the transparent component 144 is more firmly fixed to the main body 142 by bounding together with the adhesive 146. In other embodiments, the adhesive 146 can also bound other junctures of the main body 142 and transparent component 144 outside the grooves G, which should not be construed as a limitation to the invention. Furthermore, as shown in FIG. 6, the maximum of the depth d of the grooves G of the embodiment is 1 mm, for example, in order to make sure that the main body 142 can be engaged with the transparent component 144 with a good structural strength.

Figure 7:
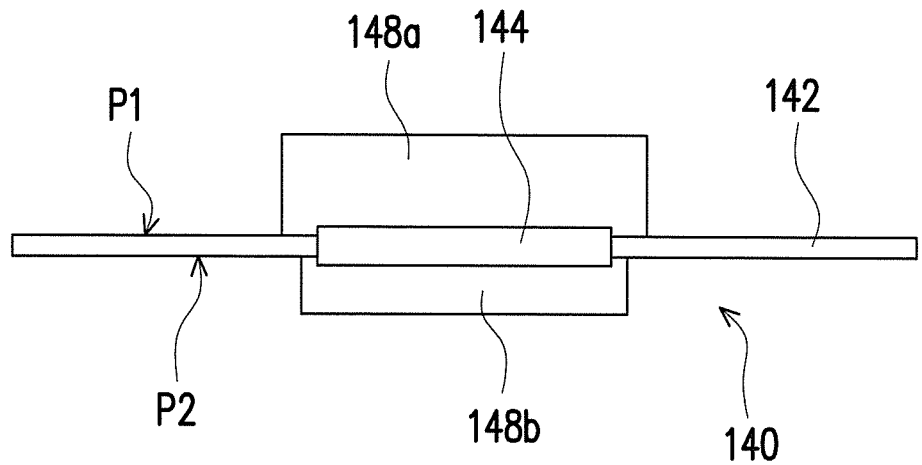
FIG. 7 is a schematic view of the transparent component sandwiched between the first component and the second component of FIG. 2.

For the sake of clearness of the drawing, FIG. 2 and FIG. 3 only show some components of the wavelength conversion device 140, and the following will describe the disposition of other components of the wavelength conversion device 140. FIG. 7 is a schematic view of the transparent component sandwiched between the first component and the second component of FIG. 2. Referring to FIG. 7, the wavelength conversion device 140 of the embodiment further includes a first component 148a and a second component 148b, wherein the first component 148a and the second component 148b are respectively disposed on two opposite surfaces P1, P2 of the main body 142, and the transparent component 144 is at least partially sandwiched between the first component 142a and the second component 142b in order to make the total structure even more firmly fixed. In the embodiment, the first component 148a is a motor, for example, driving the rotation of the main body 142, and the second component 148b is a weight block, for example, reducing the wobble of the main body 142 during the rotation, and the first component 148a and the second component 148b are located on the rotation axis of the wavelength conversion device 140. In other embodiments, the transparent component can be sandwiched by other proper forms of components, and the invention is not limited thereto.

Figure 8:
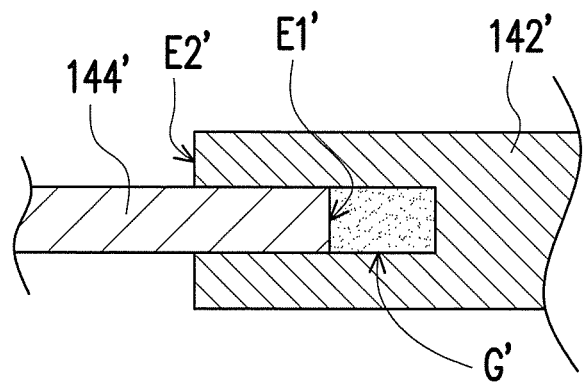
FIG. 8 is a partial cross-sectional view of a wavelength conversion device according to another embodiment of the invention.

In the above-mentioned embodiment, the grooves G are formed on the transparent component 144, but the invention is not limited thereto. The following will describe about it with figures. FIG. 8 is a partial cross-sectional view of a wavelength conversion device according to another embodiment of the invention. The difference between the main body 142', transparent component 144' of FIG. 8 and the main body 142, the transparent component 144 of FIG. 6 is that the groove G' is formed on the inner edge E2' of the slot of the main body 142', and the side E1' of the transparent component 144' is engaged in the groove G' of the inner edge E2', such that the transparent component 144' and the main body 142' are firmly fixed to each other.

In view of the above, the embodiment of the invention at least has one of the following advantages. In the wavelength conversion device of the abovementioned embodiments of the invention, the transparent component is disposed in the slot of the main body, such that the slot is fully covered by the transparent component to prevent wind-cut noise during rotation of the main body. Since the transparent component is disposed in the slot, the problem of the asymmetric structure of wavelength conversion device caused by disposing a slot can be solved. Therefore, there's no need to add another slot on the main body for solving the problem of the asymmetric structure, such that the production costs of the wavelength conversion device can be reduced, and the problem of the wind-cut noise can be prevented from becoming even worse by adding too many slots on the main body. In addition, since the main body of the wavelength conversion device doesn't need to add another slot as mentioned above, the wavelength conversion device has a bigger heat dissipation area and better heat dissipation efficiency. Moreover, one of the main body and the transparent component of the wavelength conversion device of the invention has a groove, and another one of the main body and the transparent component is fixed to the groove by matching up with it, such that the total structure of the wavelength conversion device can be more firmly fixed.

The foregoing description of the preferred embodiments of the invention has been presented for purposes of illustration and description. It is not intended to be exhaustive or to limit the invention to the precise form or to exemplary embodiments disclosed. Accordingly, the foregoing description should be regarded as illustrative rather than restrictive. Obviously, many modifications and variations will be apparent to practitioners skilled in this art. The embodiments are chosen and described in order to best explain the principles of the invention and its best mode practical application, thereby to enable persons skilled in the art to understand the invention for various embodiments and with various modifications as are suited to the particular use or implementation contemplated. It is intended that the scope of the invention be defined by the claims appended hereto and their equivalents in which all terms are meant in their broadest reasonable sense unless otherwise indicated. Therefore, the term "the invention", "the present invention" or the like does not necessarily limit the claim scope to a specific embodiment, and the reference to particularly preferred exemplary embodiments of the invention does not imply a limitation on the invention, and no such limitation is to be inferred. The invention is limited only by the spirit and scope of the appended claims. Moreover, these claims may refer to use "first", "second", etc. following with noun or element. Such terms should be understood as a nomenclature and should not be construed as giving the limitation on the number of the elements modified by such nomenclature unless specific number has been given. The abstract of the disclosure is provided to comply with the rules requiring an abstract, which will allow a searcher to quickly ascertain the subject matter of the technical disclosure of any patent issued from this disclosure. It is submitted with the understanding that it will not be used to interpret or limit the scope or meaning of the claims. Any advantages and benefits described may not apply to all embodiments of the invention. It should be appreciated that variations may be made in the embodiments described by persons skilled in the art without departing from the scope of the invention as defined by the following claims. Moreover, no element and component in the disclosure is intended to be dedicated to the public regardless of whether the element or component is explicitly recited in the following claims.

What is claimed is:

1. A wavelength conversion device, comprising:
   a main body having at least one wavelength conversion region and a slot; and
   a transparent component disposed in the slot to form a light transmission region, wherein one of the main body and the transparent component has at least one groove, and another one of the main body and the transparent component is tightly engaged with the groove, such that the main body and the transparent component are fixed together through the groove.

2. The wavelength conversion device as claimed in claim 1, wherein the groove is formed on a side of the transparent component, and an inner edge of the slot of the main body is engaged in the groove.

3. The wavelength conversion device as claimed in claim 1, wherein the groove is formed on an inner edge of the slot of the main body, and a side of the transparent component is engaged in the groove.

4. The wavelength conversion device as claimed in claim 1, further comprising an adhesive, wherein the main body and the transparent component are bounded together by the adhesive.

5. The wavelength conversion device as claimed in claim 4, wherein the adhesive is at least partially located in the groove.

6. The wavelength conversion device as claimed in claim 1, wherein the number of the at least one groove is two, and two opposite sides of the transparent component are fixed to the main body through the two grooves.

7. The wavelength conversion device as claimed in claim 1, wherein the material of the transparent component comprises glass, and the main body is a metal substrate.

8. The wavelength conversion device as claimed in claim 1, wherein the transparent component has an anti-reflection layer thereon, such that the transmittance of the transparent component is greater than 98%.

9. The wavelength conversion device as claimed in claim 1 further comprises a first component and a second component, wherein the first component and the second component are respectively disposed on two opposite surfaces of the main body, and the transparent component is at least partially sandwiched between the first component and the second component.

10. The wavelength conversion device as claimed in claim 1, wherein the transparent component fully covers the slot, such that the main body and the transparent component form a disk structure, and the groove extends in a radial direction of the disk structure.

11. A projector, comprising:
a light source suitable for providing an illumination beam;
a light valve disposed on a path of the illumination beam to convert the illumination beam into an image beam;
a lens disposed on a path of the image beam to convert the image beam into a projection beam; and
a wavelength conversion device disposed on the path of the illumination beam and comprising:
a main body having at least one wavelength conversion region and a slot; and
a transparent component disposed in the slot to form a light transmission region, wherein the main body is suitable to move such that the wavelength conversion region and the light transmission region respectively move to the path of the illumination beam, one of the main body and the transparent component has at least one groove, and another one of the main body and the transparent component is tightly engaged with the groove, such that the main body and the transparent component are fixed together through the groove.

12. The projector as claimed in claim 11, wherein the light source is a laser light source.

13. The projector as claimed in claim 11, wherein the groove is formed on a side of the transparent component, and an inner edge of the slot of the main body is engaged in the groove.

14. The projector as claimed in claim 11, wherein the groove is formed on an inner edge of the slot of the main body, and the transparent component is engaged in the groove.

15. The projector as claimed in claim 11, wherein the wavelength conversion device further comprises an adhesive, and the main body and the transparent component is bounded together by the adhesive.

16. The projector as claimed in claim 15, wherein the adhesive is at least partially located in the groove.

17. The projector as claimed in claim 11, wherein the number of the at least one groove is two, and two opposite sides of the transparent component are fixed to the main body through the two grooves.

18. The projector as claimed in claim 11, wherein the transparent component has an anti-reflection layer thereon, such that the transmittance of the transparent component is greater than 98%.

19. The projector as claimed in claim 11, wherein the wavelength conversion device further comprises a first component and a second component, and the first component and the second component are respectively disposed on two opposite surfaces of the main body, and the transparent component is at least partially sandwiched between the first component and the second component.

20. The projector as claimed in claim 11, wherein the transparent component fully covers the slot, such that the main body and the transparent component form a disk structure, and the groove extends in a radial direction of the disk structure.

* * * * *